Aug. 28, 1951  D. W. KEEF ET AL  2,565,970
TENSION MEASURING INSTRUMENT
Filed Nov. 24, 1944  2 Sheets-Sheet 1
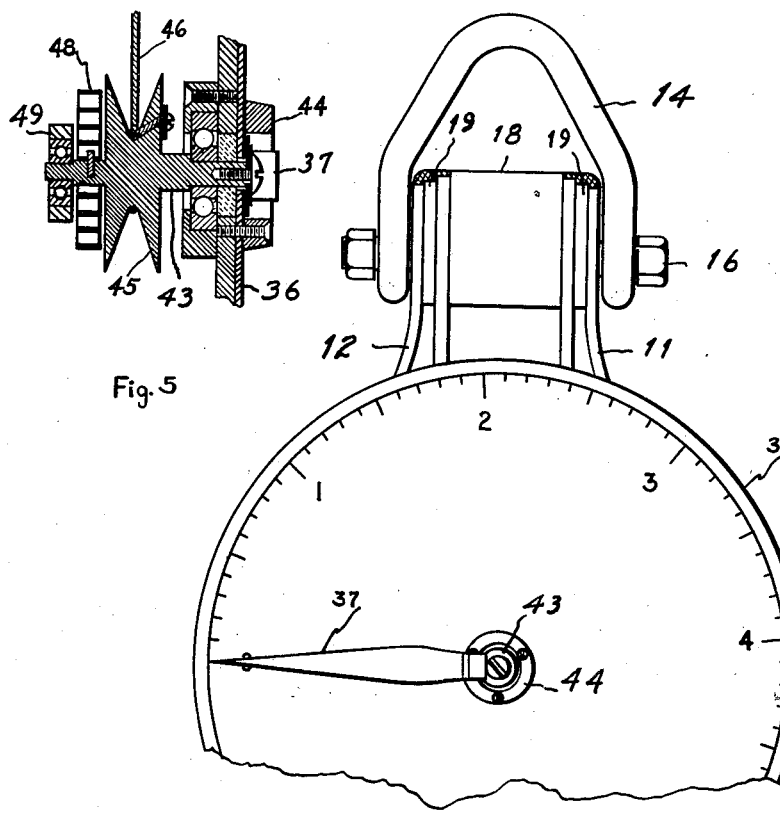
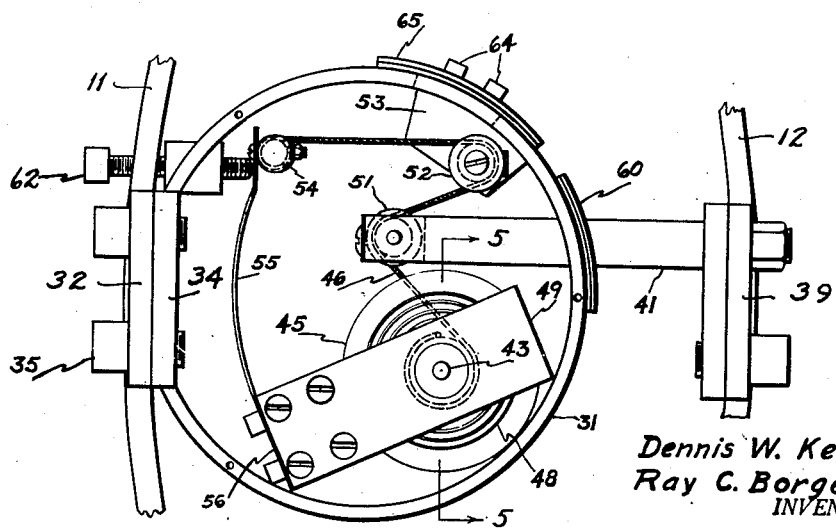
Dennis W. Keef
Ray C. Borger
INVENTORS
BY *E. A. Buckham*
Attorney

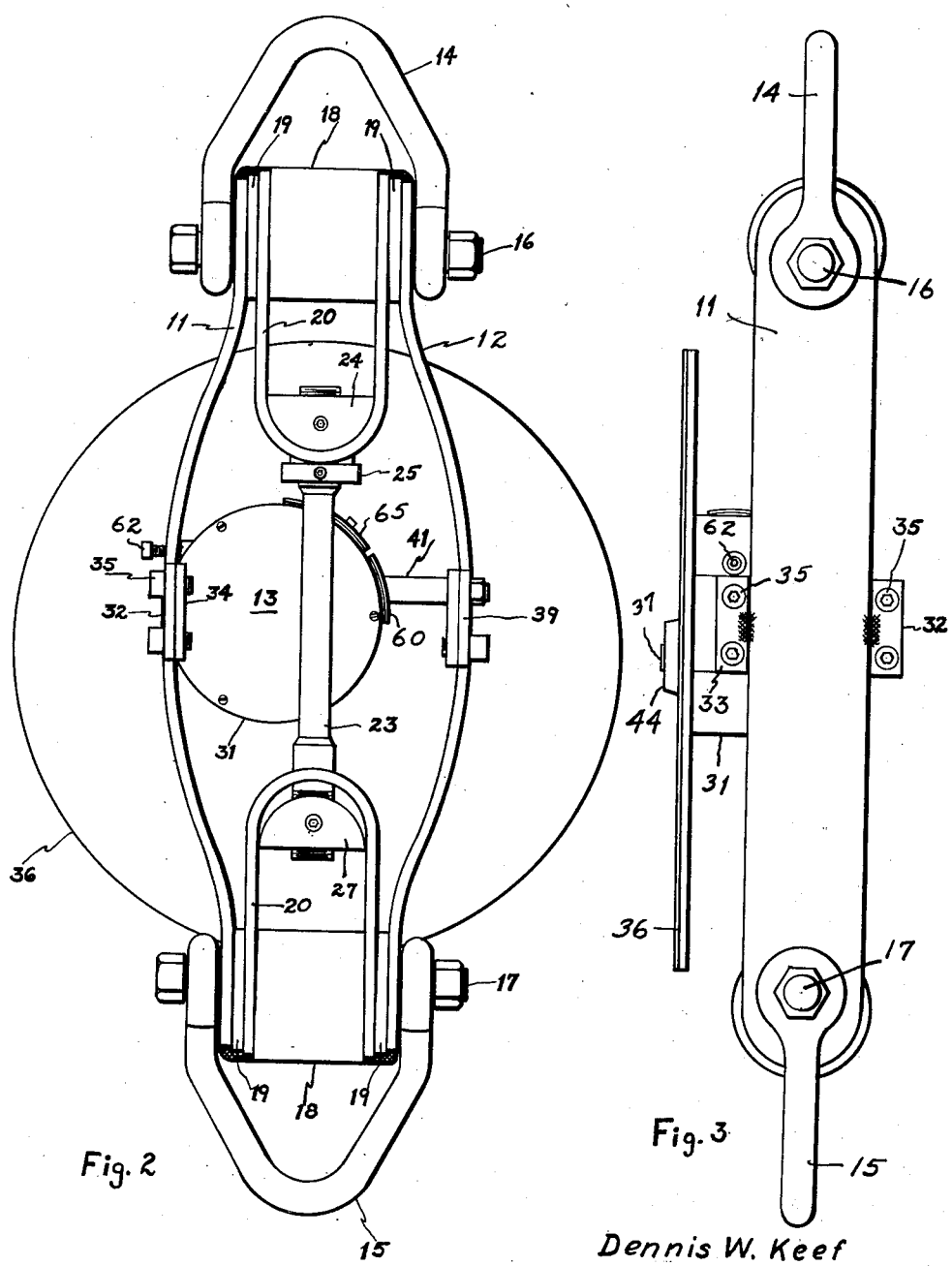

Patented Aug. 28, 1951

2,565,970

UNITED STATES PATENT OFFICE 2,565,970

TENSION MEASURING INSTRUMENT

Dennis W. Keef and Ray C. Borger, Portland, Oreg.; said Borger assignor to said Keef Application November 24, 1944, Serial No. 564,958

10 Claims. (Cl. 73—141)

This invention relates to measuring instruments and more particularly to instruments for measuring tension forces.

Traction dynamometers which have been provided heretofore for measuring tension forces, such as the loading of a cable, have been of such design as to render their use impractical except under certain conditions. Frequently the nature of the load is such that the tension in the line may fluctuate rapidly with sharp jerks and which may even vary suddenly from zero to a value beyond the breaking limit of the line. Traction dynamometers as heretofore provided cannot be used under such conditions because in the event of a jerky pull the inertia of the moving elements of the indicator mechanism is such that the mechanism is frequently permanently injured or the accuracy of the instrument thrown off. Furthermore, if a load is suddenly thrown across the instrument which is greater than the full scale capacity the indicating element is stressed beyond its elastic limit and its useful life ended.

It is an object of the present invention, therefore, to provide a new and improved measuring instrument of the class described which is relatively rugged and suitable for use under abnormal conditions without being susceptible to injury.

A further object of the present invention is to provide a traction dynamometer which is particularly suitable for measuring tension forces which may be subject to unexpected rapid and wide variations.

More specifically, it is an object of the present invention to provide a traction dynamometer which is not susceptible to injury even under excessive overload conditions, and which is provided with a built in safety device designed to assume the load in case of failure of the tension element due to repeated stressing or excessively low temperatures.

A still further object of the present invention is to provide a traction dynamometer having means for preventing the application of excessive stresses to the tension sensitive elements thereof and also means for safeguarding against injury to the indicator mechanism due to rapid variations of forces within the operating range of the instrument.

In accordance with an illustrated embodiment of the invention a traction dynamometer is provided consisting of a tension sensitive element and an indicator mechanism responsive to changes in condition of the tension sensitive element. For preventing application of stress to the tension sensitive element beyond the elastic limit thereof a slide bolt and stop arrangement is provided for assuming the load beyond a predetermined safe limit. The indicating mechanism is furthermore so designed and constructed that shocks transmitted thereto through the tension sensitive element under rapid fluctuations in the measured force will be absorbed without likelihood of causing injury to the movable indicator parts.

For a considerable of which is believed novel and inventive attention is directed to the following description taken in connection with the accompanying drawings while the features of novelty will be pointed out with greater particularity in the appended claims.

In the drawings, Fig. 1 is a fragmentary view of the front side of the measuring instrument constructed in accordance with the present invention; Fig. 2 is a rear view of the instrument shown in Fig. 1; Fig. 3 is a side view of the instrument; Fig. 4 is an enlarged view of the indicator mechanism embodied in the instrument and shown with the cover removed; Fig. 5 is a fragmentary detail view taken along the line 5—5 of Fig. 4.

Referring first to Figs. 1, 2 and 3, the measuring instrument of the invention comprises a tension sensitive element, including a pair of bow spring members 11 and 12, and an indicating mechanism 13 responsive to changes of condition of the tension sensitive element. The bow spring members 11 and 12 are secured relatively together at their opposite ends in a spaced-apart relation. Clevises 14 and 15 are mounted by means of bolts 16 and 17, respectively, on the opposite ends of the springs for the attachment of a load to the instrument though it is to be understood that the clevises may be replaced by any other suitable attachment means. It will be apparent that if the instrument is placed in tension by a pull applied to the opposite clevises 14 and 15 the bow springs 11 and 12 will tend to straighten out and the space there-between will vary in accordance with the magnitude of the pull. It will be noted that the bolts 16 and 17 extend at right angles through the holes in the opposite ends of the springs 11 and 12 so that the pull on the clevises will be transmitted accurately thereto.

In order to avoid injury to the instrument by excessive overloading and stressing of the bow spring elements 11 and 12 beyond their elastic limit means are provided for assuming the load beyond a predetermined safe limit. It will be observed that the opposite ends of the bow springs 11 and 12 are spaced apart by a heavy cylindrical member 18, washers 19 and the legs of U-shaped members 20 arranged between the opposite ends of the member 18 and the washers 19. The ends of the springs 11 and 12, the spacers 18, washers 19 and the legs of the members 20 are rigidly welded together into a single unit. The U-shaped members 20 extend toward each other between the bow springs 11 and 12 and are loosely connected together by means of a safety bolt 23. The upper end of the bolt 23, as viewed in Fig. 2, extends through an aperture in the end of the upper U-shaped member 20 and is held in place by means of a nut 24 threaded onto the upper end of the bolt, the lower surface of the nut 24 conforming to the radius of curvature of the inner rounded end of the member 20. A collar 25 is fastened onto the bolt 23 next adjacent the outer surface of the end of the U-shaped member 20. The lower end of the bolt 23 is slideably arranged through a corresponding aperture provided in the lower U-shaped member 20. A stop is provided on the lower end of the bolt 23 in the form of a nut 27, the upper surface of which is rounded to conform with the curvature of the inner end of the lower U-shaped member 20. In the unstressed condition of the bow springs 11 and 12 a space is provided between the stop nut 27 and the end of the U-shaped member 20 which space is adjusted so that upon the application of a tension force to the instrument the stop nut 27 will engage with the end of the U-shaped member 20 as the predetermined safe load for the bow springs 11 and 12 is approached. All stresses above such predetermined value will be carried by the safety bolt 23 and thus positively preclude stressing of the bow springs 11 and 12 beyond their safe limit. Particular attention is directed to the fact that the bolt 23 extends in straight alignment with the forces which may be applied to the instrument.

It will be observed that the springs 11 and 12 are bowed outwardly with respect to each other providing therebetween a space for the safety bolt arrangement as well as for the indicator mechanism 13. The indicator mechanism 13 comprises a housing 31 which, as shown, is secured to the bow spring 11 substantially at the midpoint thereof. For mounting the housing 31, a pair of small lugs 32 and 33 are welded to the edges of the spring 11 and to which lugs a strap extension 34 of the housing 31 may be secured by the screws 35. The dial 36 is secured to the housing 31 and which dial is suitably calibrated and traversed by a pointer or hand 37. The indicating instrument 13 is responsive to changes in condition of the bow springs 11 and 12 under load or, in other words, to variations in the spacing between the central portions of the outwardly bowed spring elements 11 and 12. Secured to the spring element 12 by means of pads 39 mounted on the latter is an actuator stem 41 which extends into the instrument housing 31 as shown more clearly in the enlarged view of Fig. 4.

Referring now to the views of Figs. 4 and 5, the indicator mechanism comprises a spindle 43 rotatably mounted in suitable bearings at its opposite ends and with its axis of rotation extending at right angles to the direction of movement of the actuator stem 41. The hand 37 is secured to the end of the spindle 43 on the face of the spindle dial and, as illustrated, the end of the spindle is protected within a raised bead 44 provided on the dial concentric with the end of the spindle, the end of the pointer 37 extending up over the rim 44. With this structure, it will be seen that the outer end of the spindle 43 is protected against damage such as might be caused, for example, by a wire rope dragged relatively across the dial or by the instrument's falling against some object. While the pointer 37 might become bent, it could readily be straightened while the spindle itself of the indicating instrument would not be damaged. Formed upon the spindle 43 and movable therewith is a spool 45 around which is wound a cable 46 the end thereof being suitably attached to the spool. The spindle is biased in a direction of rotation to keep the cable taut by keeping it wound up on the spool 45 by means of a helical spring 48 connected between the spindle and the bearing plate 49.

The cable 46 extends from the spool 45 over a roller 51 mounted in the end of the actuator stem 41, from there over the range adjustment roller 52 mounted upon an adjustable support 53 while the outer end of the cable is anchored as at 54 onto the end of a shock absorbing leaf spring 55. The opposite end of the leaf spring 55 is suitably secured to the housing as shown at 56. During the normal operation of the instrument the actuator stem 41 will move linearly into the interior of the housing 31 and the roller 51 in the end of the stem 41 bearing against the cable 46 will cause it to unwind from the spool 45 and to rotate the hand 37 over the dial scale to give a registration of the applied tension force. Upon withdrawal of the stem 41 from the housing the pointer will be returned to zero by the spring 48. A suitable dust seal 60 is provided on the housing 31 about the stem 41 to minimize entrance of foreign particles into the interior of the housing.

It will be obvious that the spindle 43 and spool 45 together with hand 37 will possess considerable inertia and that if the actuator stem 41 should be suddenly driven into the housing 31 by virtue of a heavy jerk in the line attached to the opposite ends of the instrument the cable 46 might be broken, or stretched, the spindle 43 bent, the hand 37 snapped off or the instrument otherwise damaged. The resilient anchorage for the outer end of the cable 46 will satisfactorily prevent any such injury occurring to the instrument. The leaf spring 55 possesses a strength considerably greater than that of the helical spring 48 particularly when it is noted that the moment arms of their points of application on spool 43 and spindle 45 appreciably favors leaf spring 55. Also, leaf spring 55 possesses a strength considerably less than the breaking strength of cable 46 so that any sudden movement of the actuator stem into the housing will simply result in flexing of the leaf spring 55 until the opposite end of the cable has had full opportunity to unwind from the spool 45 and rotate the hand 37 through the proper angle. Zero adjustment of the hand 37 is effected by means of the zero adjusting screw 62, the inner end of which forms a back stop for the outer end of the leaf spring 55 adjacent the anchor 54 for the cable 46.

Control of the movement characteristics of the pointer with respect to degrees of movement of the stem 41 may be effected by suitable selection of the length of the actuator stem 41 with particular regard to that portion extending into the interior of the housing 37 and also by adjustment of the roller 52. The supporting bracket 53 for the roller 52 is movable along the inner wall of the housing 31, its position of adjustment being capable of being fixed by the screws 64 extending through a slot in the sidewall of the housing 31, the inner ends of the screws 64 being threaded into the bracket 53. By movement of the bracket and roller 52 in a direction along the side wall of the housing the angle between the portions of cable 46 on opposite sides of the roller 51 may be increased or decreased. With a relatively great angle between these two cable portions an increment of movement of the stem 41 will cause a relatively small angle of movement of the hand 37. On the other hand, by decreasing the angle between the portions of the cable on the opposite sides of the roller 51 the same increment of movement of the stem 41 will cause a larger angle of movement of the hand 37.

As is well known by those skilled in the art, upon application of load, the bow springs 11 and 12 move toward each other at a progressively decreasing rate with increase in load and as the springs approach the straightened condition. By proper adjustment of the position of the adjustable roller 52, compensation can be made for the decreasing movement characteristics of the bow springs by increasing the rate of angular movement of the spindle 43 per increment of inward movement of the actuator stem 41. Referring to Fig. 4, it will be observed that, in the relative position of the parts shown, a relatively large angle is formed between the rollers 51 and 52. As the stem 41 is moved inwardly of the housing 31 upon application of load, the included angle between the stem and the cable portion between rollers 51 and 52 becomes smaller. As explained above, as this angle decreases, the rate of movement of the spindle 43 increases progressively with respect to the inward rate of movement of the stem 41. By suitable adjustment of the position of the roller 52, complete compensation may be effected so that the pointer 37 attached to the spindle 43 will move across the face of the dial with a straight line characteristic throughout the full range of the instrument capacity.

It will be obvious from the description given that many variations may be made from the details illustrated and described. For example, the invention is not limited to the specific form of bow springs shown but any resilient or spring means susceptive of deformation under a tension force is represented thereby. Furthermore, it will be obvious that the indicating mechanism described may equally well be used in connection with other means for registering changes of dimensions, shape, or relative positions.

In the appended claims we specifically intend to cover not only the whole combination but also the sub-combinations of the present disclosure in all the various modifications and variations as fall within the true spirit and scope of the invention.

The invention is hereby claimed as follows:

1. In an instrument of the class described, a pair of bow springs arranged with their bow portions extending outwardly with respect to each other, spacer means arranged between the opposite ends of said pair of springs and rigidly connected thereto, a clevis connected to each of the opposite ends of said pair of springs for attaching a load thereto, an indicator means arranged between said pair of springs and fixedly mounted on one thereof, an operating stem fixedly connected to the other of said springs and operatively associated with said indicator means for causing it to register in accordance with the loading of said springs, a bolt rigidly connected to the spacer at one end of said springs and slidably arranged relative to the spacer at the opposite end of said springs, said bolt extending in an aligned relation between said clevises, a stop on said slideable end of said bolt and means secured to the end of said springs adjacent the slidable end of said bolt for engaging with said stop for limiting the loading of said pair of springs.

2. An instrument of the class described, comprising a pair of bow springs arranged with the bows thereof extending outwardly in opposite directions, spacer means arranged between the opposite ends of said pair of springs, a clevis attached to the opposite ends of said pair of springs for attaching a load thereto for causing said springs to straighten under influence of load, an indicator means arranged between said pair of springs and fixedly mounted upon one thereof, a stem fixedly secured to the mid-portion of the other of said pair of springs and operatively associated with said indicator means for causing it to register in accordance with the loading on said pair of springs, said spacer means at each of the opposite ends of said springs including a U-shaped member, a bolt rigidly secured at one end to one of said U-shaped members, the opposite end of said bolt being slideably arranged through an aperture in the opposite U-shaped member, a stop on the outer end of said bolt and adapted to engage with the inner surface of said corresponding U-shaped member upon pre-determined loading of said device for precluding overstressing of said pair of bow springs.

3. An indicator instrument comprising a housing, a spindle mounted in said housing, a cable wound about said spindle and having one end fastened thereto, an anchor for the opposite end of said cable, an actuator stem slideably mounted in said housing for movement in a plane at right angles to said spindle, the end of said stem engaging with said cable between said spindle and said anchor for causing unwinding of said cable and movement of said spindle, a resilient support for said anchor for absorbing the shock of sudden forward movements of said stem.

4. An indicator instrument comprising a housing, a spindle mounted in said housing, a cable wound about said spindle and having one end fastened thereto, an anchor for the opposite end of said cable, spring means connected to said spindle for normally maintaining said cable taut between said spindle and said anchor, an actuator stem slideably mounted in said housing for movement in a plane at right angles to said spindle, a roller in the end of said stem engaging with said cable between said spindle and said anchor, a leaf spring secured at one end to said housing and supporting said anchor at the opposite end, a screw providing an adjustable back-stop for the end of said leaf spring and a zero adjustment for said spindle.

5. An indicator instrument comprising a housing, a spindle in said housing, a cable wound about said spindle and fastened thereto, an adjustable anchor for the outer end of said cable, spring means biasing said spindle in such a direction of rotation as to maintain said cable taut, an actuator stem slideably mounted in said housing and movable in a plane at right angles to said spindle, said stem being adapted for engaging with said cable for unwinding said cable from said spindle and causing rotation thereof, and an adjustment roller adjustably mounted on said housing supporting the cable between said stem and said anchor, said adjustment roller being adjustable in an arcuate direction about said spindle whereby the angular movement of said spindle per increment of linear movement of said stem may be controlled.

6. In an instrument of the class described, a pair of elongated bow springs, a spacer arranged between the opposite ends of said pair of springs and rigidly connected thereto, said spacer at each of the opposite ends of said springs including a U-shaped member, the closed ends of said members extending toward each other between said springs, aligned openings in the adjacent ends of each of said members, a bolt extending through said openings, stops on the outer ends of said bolt adapted to engage with the inner surface of the corresponding adjacent member upon predetermined loading of said instrument for precluding overstressing of said springs.

7. In an instrument of the class described, a pair of bow springs arranged with the bows thereof extended outwardly in opposite directions, a U-shaped member arranged between each of the opposite ends of said pair of bow springs, a spacer arranged between the ends of each of said U-shaped members, said springs, members and spacers being rigidly secured together, the closed ends of said members extending toward each other between said springs, aligned openings in the adjacent ends of said members, a bolt arranged through said openings and having a stop on each of the outer ends thereof adapted to engage with the inner surface of said members upon predetermined loading of said instrument for precluding overstressing of said springs, a pin at each of the opposite ends of said instrument extending through the end portions of said springs and the end portions of said member and spacer therebetween and a clevis connected to the opposite ends of said pin on each of the opposite ends of said instrument for attachment of a load thereto.

8. In a dynamometer of the class described including a pair of bow spring members having means for attaching a load to the opposite ends thereof and in which the mid portions of the spring members tend to move toward each other upon application of load but at a progressively decreasing rate with increase in load, the combination comprising an indicator housing mounted on one of said spring members, a spindle mounted in said housing at right angles with respect to the plane of movement of said spring members, a cable having one end portion wound about said spindle and with the end of said portion fastened thereto, a resilient anchor for the opposite end of said cable, an actuator stem secured to the other of said pair of spring members and extending into said housing for movement in a plane at right angles to said spindle, a roller in the end of said stem bearing against said cable, an adjustment roller mounted on said housing and supporting said cable between said stem and said anchor, an adjustable support for said adjustment roller, means for adjusting said adjustment roller support for controlling the angle between said stem and the cable portion between said stem and said adjustment roller so as to vary the rate of the progressively greater angular movement of said spindle upon inward movement of said stem and compensate for the decreasing characteristic of said spring members.

9. In a bow spring dynamometer of the class described including a pair of bow spring members having means for attachment of a load to the opposite ends thereof and in which the mid portions of the springs tend to move toward each other upon application of load but at a progressively decreasing rate with further increase in load, the combination comprising an indicator housing mounted on one of said spring members, a spindle mounted in said housing at right angles with respect to the plane of movement of said body springs, a cable having one end portion wound about said spindle and with the end of said portion fastened thereto, an adjustable support for said cable spaced from said spindle, an actuator stem secured to the other of said pair of spring members and extending into said housing for movement in a plane at right angles to said spindle, a roller in the end of said stem bearing against said cable between said spindle and said support, means for adjusting said support for varying the angle between said stem and the cable portion between said stem and said support so as to vary the rate of the progressively greater angular movement of said spindle upon inward movement of said stem and compensate for the decreasing characteristic of said spring members.

10. In a bow spring dynamometer of the class described the combination including a pair of bow spring members having means for attachment of a load to the opposite ends thereof and in which the mid portions of the springs tend to move toward each other upon application of load but at a progressively decreasing rate with further increase in load, an indicator housing mounted on one of said spring members, a spindle mounted in said housing at right angles with respect to the plane of movement of said body springs, a cable having one end portion wound about said spindle and with the end of said portion fastened thereto, an adjustable support for said cable spaced from said spindle, an actuator stem secured to the other of said pair of spring members and extending into said housing for movement in a plane at right angles to said spindle, a roller in the end of said stem bearing against said cable between said spindle and said support, said support and said spindle being spaced a considerable distance from the opposite sides of said stem, means for adjusting said support for varying the angle between said stem and the cable portion between said stem and said support so as to vary the rate of the progressively greater angular movement of said spindle upon inward movement of said stem and compensate for the decreasing movement characteristic of said spring members.

DENNIS W. KEEF.
RAY C. BORGER.

REFERENCES CITED

The following references are of record in the file of this patent:

UNITED STATES PATENTS

| Number | Name | Date |
|---|---|---|
| 15,608 | Gibbs | Aug. 26, 1856 |
| 283,627 | Logan | Aug. 21, 1883 |
| 342,550 | Ward | May 25, 1886 |
| 1,006,924 | Erb | Oct. 24, 1911 |
| 1,580,430 | Gaines | Apr. 13, 1926 |
| 1,614,354 | Faber | Jan. 11, 1927 |
| 1,696,148 | Camp | Dec. 18, 1928 |
| 1,842,502 | Blomquist | Jan. 26, 1932 |
| 2,287,299 | Dillon | June 23, 1942 |

FOREIGN PATENTS

| Number | Country | Date |
|---|---|---|
| 12,922 | Great Britain | 1908 |
| 311,315 | Germany | Mar. 12, 1919 |